US007157701B2

(12) United States Patent
Ermer

(10) Patent No.: US 7,157,701 B2
(45) Date of Patent: Jan. 2, 2007

(54) COMPACT TIME-OF-FLIGHT MASS SPECTROMETER

(75) Inventor: David R. Ermer, Starkville, MS (US)

(73) Assignee: Mississippi State University Research and Technology Corporation, Mississippi State, MS (US)

(*) Notice: Subject to any disclaimer, the term of this patent is extended or adjusted under 35 U.S.C. 154(b) by 46 days.

(21) Appl. No.: 11/129,921

(22) Filed: May 16, 2005

(65) Prior Publication Data

US 2005/0269505 A1 Dec. 8, 2005

Related U.S. Application Data

(60) Provisional application No. 60/572,614, filed on May 20, 2004.

(51) Int. Cl.
*B01D 59/44* (2006.01)

(52) U.S. Cl. ...................... 250/287; 250/288; 250/290; 250/281; 250/282; 250/283

(58) Field of Classification Search ..................... None
See application file for complete search history.

(56) References Cited

U.S. PATENT DOCUMENTS

| | | | | |
|---|---|---|---|---|
| 2,612,607 | A | 9/1952 | Stephens | |
| 2,685,035 | A | 7/1954 | Wiley | |
| 4,731,532 | A | 3/1988 | Frey et al. | |
| 5,118,937 | A | 6/1992 | Hillenkamp et al. | |
| 5,969,348 | A | 10/1999 | Franzen | |
| 6,013,913 | A | 1/2000 | Hanson | |
| 6,204,500 | B1 | 3/2001 | Whitehouse et al. | |
| 6,518,568 | B1 | 2/2003 | Kovtoun et al. | |
| 6,600,155 | B1 | 7/2003 | Andrien, Jr. et al. | |
| 6,858,840 | B1 | 2/2005 | Berkout et al. | |
| 2005/0127289 | A1* | 6/2005 | Fuhrer et al. ............... | 250/288 |

OTHER PUBLICATIONS

Stephens, W.E., "A Pulsed Mass Spectrometer with Time Dispersion," Proceedings of the American Physical Society, Phys. Rev., 1946, p. 691, vol. 69.

Wiley, W. C. and McLaren, I. H., "Time-of-Flight Mass Spectrometer with Improved Resolution," Rev. Sci. Instrumen., Dec. 1955, pp. 1150-1157, vol. 26.

(Continued)

*Primary Examiner*—Nikita Wells
*Assistant Examiner*—Zia R. Hashmi
(74) *Attorney, Agent, or Firm*—Kristin L. McCandless

(57) ABSTRACT

The invention provides a method of design for a time-of-flight mass spectrometer that is compact and has high mass resolution over a broad range of ion masses. This method of design, for the high-resolution analysis of analyte ions in the time-of-flight mass spectrometer, includes decreasing the strength of the time-dependent extraction potential according to a predetermined continuous function so as to spread out the energy distribution of the ions and achieving high mass resolution over a broad range of masses without altering the time dependence or magnitude of the applied potentials, across the acceleration region and ion mirror, and the time-dependent extraction potential, and not changing the physical dimensions of the mass spectrometer. Using this method of design, mass resolution of approximately or greater than 10,000 can be achieved over approximately five orders of magnitude of mass for a time-of-flight mass spectrometer having a total overall length of less than 46 cm.

22 Claims, 5 Drawing Sheets

OTHER PUBLICATIONS

Gohl, W., et al. "Time-of-Flight Mass Spectrometry for Ions of Large Energy Spread," Int'l. J. Mass Spectrom. Ion Phys., 1983, pp. 411-414, vol. 48, Elsevier Scientific Publishing Company, Amsterdam, Netherlands.

Kovtoun, S.V., "An Approach to the Design of Mass-correlated Delayed Extraction in a Linear Time-of-Flight Mass Spectrometer," Rapid Comm. Mass Spectrom., 1997, pp. 433-436, vol. 11, John Wiley & Sons, Ltd.

Kovtoun, S.V., "Mass-correlated Delayed Extraction in Linear Time-of-Flight Mass Spectrometers," Rapid Comm. Mass Spectrom., 1997, pp. 810-815, vol. 11, John Wiley & Sons, Ltd.

English, R.D. and Cotter, R.J., "A Miniaturized Matrix-assisted Laser Desorption/Ionization Time of Flight Mass Spectrometer with Mass-correlated Acceleration Focusing," J. Mass Spectrom., 2003, pp. 296-304, vol. 38.

Gillespie, G.H. and Brown, T.A., "Optics Elements for Modeling Electrostatic Lenses and Accelerator Components I. Einzel Lenses," Proceedings of the 1997 Particle Accelerator Conference (cat No. 97CH36167)Piscataway NJ, USA: IEEE, 1998, pp. 2559-2561, vol. 2.

Dahl, P., "Chapter 5 Lenses," Introduction to Electron and Ion Optics, 1973, pp. 55-72, Academic Press, New York and London.

Polyak, R.A., "Log-Sigmoid Multipliers Method in Constrained Optimization," Annals of Operations Research, 2001, pp. 427-460, vol. 101, Kluwer Academic Publishers, Netherlands.

Pinter, J.D., "Part One Global Optimization: A Brief Review," Global Optimization in Action, 1997, pp. 3-37, Kluwer Academic Publishers, Dordrecht, Netherlands.

Adjiman, C.S. et al., "A Global Optimization Method, aBB, for General Twice-Differentiable Constrained NLPs—I. Theoretical Advances," Comp. Chem. Engng., 1998, pp. 1137-1158, vol. 22, Elsevier Science Ltd, Great Britain.

Wang, T., "Global Optimization for Constrained Nonlinear Programming," 2001, Ph.D. Thesis, Dept. of Computer Science, Univ. of Illinois, Urbana, IL.

Yuret, D., "From Genetic Algorithms to Efficient Optimization," May 1994, Massachusetts Institute of Technology A.I. Technical Report No. 1569.

* cited by examiner

| *Design Parameters* | *Value* | *Min* | *Max* | *Units* | *Constrained* |
|---|---|---|---|---|---|
| $d_1$ | $5.08\times10^{-3}$ | $5.0\times10^{-3}$ | $1.0\times10^{-2}$ | meters | True |
| $d_2$ | $9.26\times10^{-3}$ | $1.0\times10^{-4}$ | $1.0\times10^{-2}$ | meters | True |
| $d_3$ | $1.51\times10^{-1}$ | $1.0\times10^{-2}$ | $2.0\times10^{-1}$ | meters | True |
| $d_4$ | $1.75\times10^{-1}$ | $1.0\times10^{-2}$ | $2.0\times10^{-1}$ | meters | True |
| $V_0$ | $5.42\times10^{3}$ | $1.0\times10^{1}$ | $8.0\times10^{3}$ | Volts | True |
| $V_{1a}$ | $4.76\times10^{2}$ | $1.0\times10^{1}$ | $8.0\times10^{3}$ | Volts | True |
| $V_{1b}$ | $5.62\times10^{3}$ | $1.0\times10^{1}$ | $8.0\times10^{3}$ | Volts | True |
| $\alpha_a$ | $6.48\times10^{7}$ | $1.0\times10^{3}$ | $1.0\times10^{8}$ | $sec^{-1}$ | False |
| $\alpha_b$ | $4.62\times10^{6}$ | $1.0\times10^{3}$ | $1.0\times10^{8}$ | $sec^{-1}$ | False |
| $V_2$ | $4.54\times10^{3}$ | $1.0\times10^{-4}$ | $2.0\times10^{4}$ | Volts | True |
| $V_3$ | $1.25\times10^{4}$ | N/A | N/A | Volts | False |
| $\Delta t_1$ | $1.91\times10^{-8}$ | $1.5\times10^{-8}$ | $1.0\times10^{-6}$ | sec | True |
| $\Delta t_2$ | $1.0\times10^{-10}$ | $1.0\times10^{-10}$ | $1.0\times10^{-7}$ | sec | False |
| $d_5$ | $1.65\times10^{-1}$ | $1.0\times10^{-3}$ | $2.0\times10^{-1}$ | meters | True |

FIG. 5

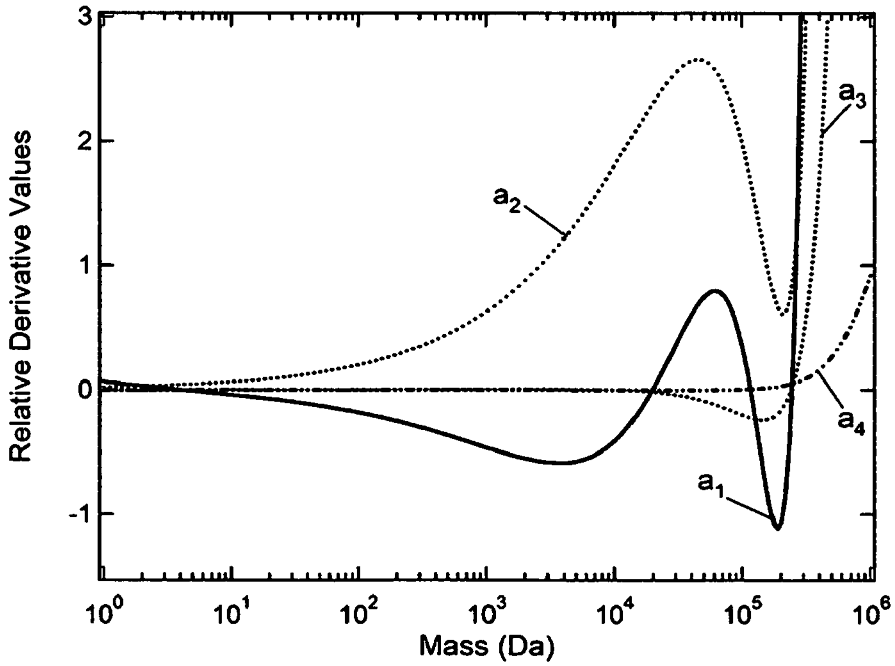

FIG. 6

COMPACT TIME-OF-FLIGHT MASS SPECTROMETER

CROSS-REFERENCE TO RELATED APPLICATION

This application claims the benefit of U.S. Provisional Application Ser. No. 60/572,614, filed May 20, 2004. The entire disclosure of this priority application is incorporated herein by reference in its entirety.

TECHNICAL FIELD OF THE INVENTION

This invention relates to time-of-flight (TOF) mass spectrometers, and in particular to a method and design for decreasing the physical size and increasing the mass resolution over a broad range of ion masses in TOF mass spectrometers.

BACKGROUND OF THE INVENTION

Mass spectrometry is a well-known analytical technique for the accurate determination of molecular weights, identification of chemical structures, determination of the composition of mixtures, and qualitative elemental analysis. A mass spectrometer generates ions of sample molecules under investigation, separates the ions according to their mass-to-charge ratio, and measures the abundance of each ion. The ion mass is expressed in Daltons (Da), or atomic mass units and the ion charge is the charge on the ion in terms of the number of electron charges.

Time-of-flight (TOF) mass spectrometers separate ions according to their mass-to-charge ratio by measuring the time it takes generated ions to travel to a detector. The flight time of an ion accelerated by a given electric potential is proportional to its mass-to-charge ratio. Thus, the TOF of an ion is a function of its mass-to-charge ratio and is approximately proportional to the square root of the mass-to-charge ratio. TOF mass spectrometers are relatively simple, inexpensive, and have a virtually unlimited mass-to-charge ratio range. Since other types of mass spectrometers are not capable of detecting the ions of large organic molecules, TOF mass spectrometers are very beneficial in this particular area of use. However, the earliest TOF mass spectrometers, see Stephens, W. E., Phys. Rev., vol. 69, p. 691, 1946 and U.S. Pat. No. 2,612,607, had poor mass resolution (i.e., the ability to differentiate ions having almost the same mass at different flight times).

Ideally, all ions of a particular mass have the same charge and arrive at the detector at the same time, with the lightest ions arriving first, followed by ions progressively increasing in mass. In practice, ions of equal mass and charge do not arrive at the detector simultaneously due to the initial temporal, spatial, and kinetic energy distributions of generated ions. These distributions may be inherent to the method used to generate the ions or may be generated by collisions during the extraction of ions from the source region. These initial distribution factors lead to a broadening of the mass spectral peaks, which leads to limits in the resolving power of the TOF mass spectrometer.

TOF mass spectrometers were first designed and commercialized in late 1940s and mid 1950s. Major improvements in TOF mass spectrometers were made by William C. Wiley and I. H. McLaren. These instruments are typically designed by seeking a set of design parameters that cause the first and/or second partial derivative of the time-of-flight with respect to the initial ion velocity identically to be zero. See U.S. Pat. No. 2,685,035 and Wiley, W. C. and McLaren, I. H., *Rev. Sci. Instrumen., vol.* 26, pp. 1150–57, 1955. These inventions resulted in the improved mass resolution by the use of a time-lag focusing scheme that corrected for the initial spatial and kinetic energy (velocity) distributions of the ions. More recent improvements to TOF mass spectrometers to reduce temporal and spatial distributions include energy focusing by the use of ion reflectors. See U.S. Pat. No. 4,731,532 and U.S. Pat. No. 6,013,913.

To date, all ion-focusing schemes have assumed that the best way to deal with a large spread in initial ion energy distribution is to reduce the energy spread in the extraction region. See Gohl, W., et al., *Int. J. Mass Spectrom. Ion Phys., vol* 48, pp. 411–14, 1983. The prime example of this is the commonly used delay extraction technique, which was developed to specifically narrow the energy distribution of the ions. Other methods to narrow the initial ion energy distribution have included monotonically increasing the extraction potential. See U.S. Pat. No. 5,969,348. None of these methods have allowed for the development of a compact TOF mass spectrometer that retains the high mass resolution of full sized instruments.

Even though these TOF mass spectrometer methods have increased mass resolution over a broad range of ion masses, greater improvements are warranted. There is a growing demand for more compact, high mass resolution, broad mass spectrum mass spectrometers, especially for applications such as the detection of biologically important molecules in extraterrestrial environments for proteomics, rapid identification of biological agents, or the detection of infectious disease contamination in hospitals. Therefore, it is an object of this invention is to provide a method and design for a TOF mass spectrometer that has greater mass resolution over a broad range of ion masses. An additional object of this invention is to provide a method and design for decreasing the physical size of the TOF mass spectrometer while providing high mass resolution over a broad range of ion masses.

SUMMARY OF THE INVENTION

This invention provides a method for high-resolution analysis of analyte ions in a time-of-flight mass spectrometer (TOF-MS). This method for high-resolution analysis includes decreasing the strength of the time-dependent extraction potential according to a predetermined continuous function so as to spread out the energy distribution of the ions. The method of high-resolution analysis also includes having like charge-to-mass ratio ions generated in ionization arrive at the ion detector at a time that is substantially independent of initial ion velocity and initial position of the ion in the source/extraction region at the beginning of ion extraction. Additionally, the method includes achieving high mass resolution over a broad range of masses without altering the magnitude of the applied potentials across the acceleration region and ion mirror, and the time dependence or magnitude of the time-dependent extraction potential, and not changing the physical dimensions of the TOF-MS.

Additionally, this invention provides a design of a time-of-flight mass spectrometer (TOF-MS) contained in a vacuum housing. The design of the TOF-MS includes a means for applying a time-dependent extraction potential according to a predetermined continuous function so as to spread out the energy distribution of the ions as they travel through the source/extraction region. Further, the design of the high mass resolution TOF-MS includes a vacuum housing with a total length of about 5 cm to 80 cm.

BRIEF DESCRIPTION OF THE FIGURES

FIG. 5 is a table of the results of the nonlinear optimization and the constraints placed on the design parameters using a preferred method of design of the present invention.

FIG. 6 illustrates a plot of the first four partial derivatives of the time-of-flight through the TOF mass spectrometer as a function of mass for an initial ion velocity of 100 m/s, the $\alpha_n$ in Eq. (7). The total derivative of the time-of-flight with respect to the initial ion velocity involves a sum of these derivatives, as specified by Eq. (3). The oscillatory nature of these partial derivatives can be exploited to provide high mass resolution across a broad range of ion masses.

DETAILED DESCRIPTION

Time-of-flight (TOF) mass spectrometry is commonly used for the detection and identification of molecules having a wide range of masses from atomic species to double stranded DNA fragments with masses as high as 500 kDa. Several refinements have been made to the basic linear TOF system. Delayed extraction, ion mirrors, etc. have been introduced to improve the performance of TOF mass spectrometers. Ion mirror designs are able to provide high mass resolution over a very narrow range of masses and mass correlated acceleration (MCA) designs have been proposed that provide high mass resolution over a mass range of approximately three orders of magnitude. See Kovtoun, S. V., "An Approach to the Design of Mass-correlated Delayed Extraction in a Linear Time-of-Flight Mass Spectrometer," *Rapid Comm. Mass Spectrom.*, vol. 11, pp. 433–36, 1997; Kovtoun, S. V., "Mass-correlated Delayed Extraction in Linear Time-of-Flight Mass Spectrometers," *Rapid Comm. Mass Spectrom.*, vol. 11, pp. 810–15, 1997; and English, R. D. and Cotter, R. J., "A Miniaturized Matrix-assisted Laser Desorption/Ionization Time of Flight Mass Spectrometer with Mass-correlated Acceleration Focusing," *J. Mass Spectrom.*, vol. 38, pp. 296–304, 2003.

Typically, two types of corrections can be made to a spectrometer design. If ions are generated over some region of space, corrections must be made to compensate for different path lengths as ions of the same mass travel from the ion source region to the detector. This is called space focusing. If the ions have some initial kinetic energy/velocity distribution, then energy focusing is used to compensate for different initial energies/velocities. Any method of design for a TOF mass spectrometer must assure that both of these types of corrections are part of a final design.

Figure 1:
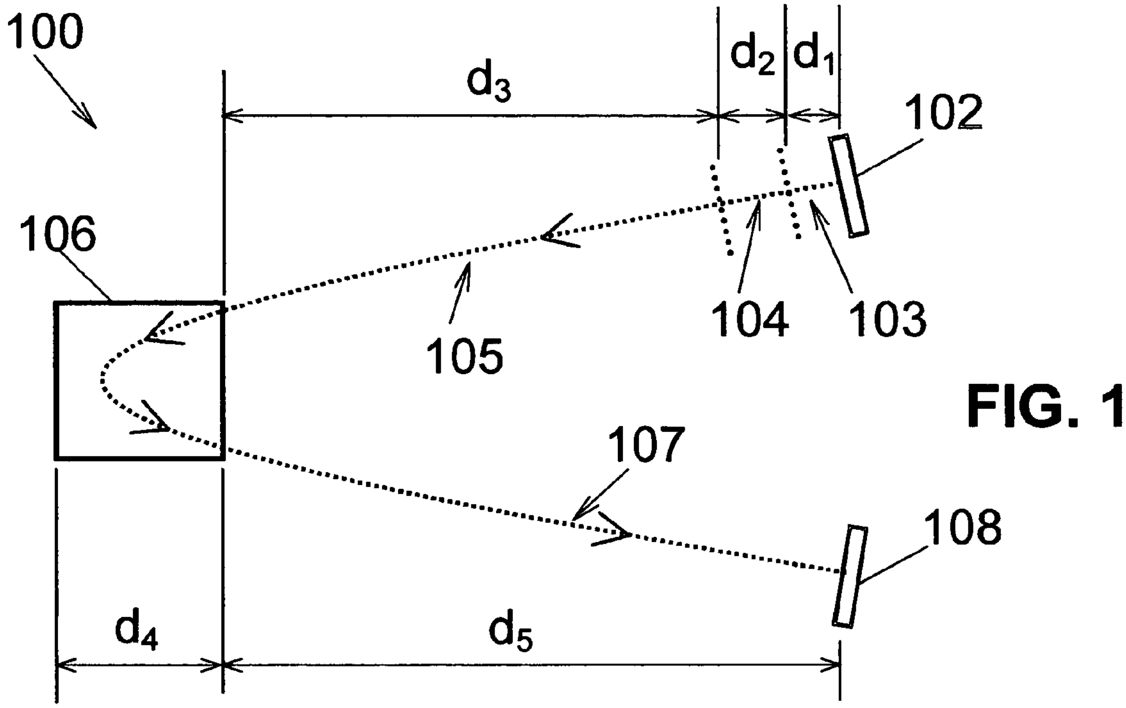
FIG. 1 illustrates the basic design of an embodiment of the present invention time-of-flight mass spectrometer employing an ion mirror.

A schematic of an embodiment of the present invention time-of-flight mass spectrometer (TOF-MS) 100 employing an ion mirror 106 and configured for laser based mass spectrometry is shown in FIG. 1. Ions travel through the TOF-MS 100. The path and direction of ion travel through the TOF-MS 100 is indicated by the arrows along the dotted line, as shown. The ions are generated at the surface of the sample holder 102 by a focused laser pulse. For laser-based ionization the laser is absorbed by the sample, both vaporizing and ionizing a portion of the sample. To minimize the spatial distribution of the ions, it is preferred that the width of the laser pulse be short. Therefore, the laser pulse is preferably generated by a laser operating at a wavelength that is absorbed by some component of the sample with a pulse width of less than 100 ns. An electric potential $V_{ext}$, which may be time-dependent, across the source/extraction region 103, pulls the ions out of the laser plume. Preferably, the length of sample holder 102 is less than 0.5 cm, with each of the other dimensions of sample holder 102 preferably less than 5 cm. The length $d_1$ of the source/extraction region 103 is preferably on the order of 0.5 cm, with each of the other dimensions of the source/extraction region 103 preferably less than 5 cm. The potential applied across the acceleration region 104 gives the ions their final kinetic energy. Preferably, the length $d_2$ of the acceleration region 104 is on the order of less than 1.0 cm, with each of the other dimensions of acceleration region 104 preferably less than 5 cm. The length of these regions and the potentials across the regions also provide space and/or energy focusing, when their values are properly chosen. The ions then drift through a first field free region 105 of length $d_3$, preferably of about 15 cm, and enter the ion mirror 106 of length $d_4$, preferably of about 18 cm. For both the first field free drift region 105 and the ion mirror 106 each of the other dimensions is preferably less than 10 cm. The ions' direction of travel is then turned around by the potential $V_3$ across the ion mirror 106. A properly designed ion mirror 106 provides further focusing by correcting for the different flight times of ions with the same mass but different kinetic energy. The ions finally drift through a second field free region 107 of length $d_5$, preferably of about 17 cm, with each of the other dimensions of second field free region 107 preferably less than 10 cm, before striking the ion detector 108. Ion detector 108 preferably has a length of approximately 5 cm, with each of the other dimensions of ion detector 108 preferably less than 5 cm. Ion detectors that are commercially available and that are designed for compact TOF-MS 100 instruments, are preferable, such as ion detectors with a fast time response because the short total time-of-flight in a compact TOF-MS 100, for example, those made by Burle Electro-Optics, Inc. The total length of the TOF-MS 100 is preferably then about 35 cm. The other dimensions of the various components used to construct the TOF-MS 100 should be such that the vacuum housing containing the TOF-MS 100 should be slightly longer than the total length of the TOF-MS 100, preferably about 40 cm, with each of the other dimensions preferably 10 cm or less. Standard TOF-MS construction techniques and materials can be used to construct the TOF-MS 100 of the present invention. However, under appropriate circumstances, lengths $d_1$ through $d_5$ and the total length of TOF-MS 100, dimensions of the various components and regions, as well as the dimensions of the vacuum housing may vary due to design requirements, such as the mass range over which it is desired to optimize the TOF-MS 100, the desire to build a portable device, or the time response of available detectors, etc.

With the exception of the ion mirror 106 potential $V_3$, electric potentials are placed across the various regions of the spectrometer along the axis of the region in such a way that causes the ion to travel in the direction indicated by arrows on the dotted line, as shown in FIG. 1. For example, in the case of a positive ion, the electric potential in the acceleration region 104 is higher by an amount of substantially $V_2$ at the point where the ion enters the acceleration region 104 than the point at which the ion exits the acceleration region 104 as the ion travels along the indicated path, as shown. The potential across the ion mirror 106 is such that it turns the ion around and directs it back toward the detector. One skilled in the art of TOF-MS design understands how to apply potentials in such a way as to configure the device to detect positive or negatively charge ions. In general, potentials are applied across regions by setting the potential of at least two metal electrodes, one electrode at substantially the beginning of the region and one electrode at substantially the end of the region. Typically, the potential changes in a substantially linear fashion over the length of the region. These electrodes can be either flat grids, which have holes uniformly spaced over their surface for the ions to pass through, or annular electrodes, which allow the ions to pass through the center of the electrode. Typical ion mirror designs are made with electrodes, typically grids, at either end, with a series of annular electrodes in between, whose potentials are set by a resistor divider network between the two end electrodes. It is only necessary that desired potential difference be applied substantially across the flight path of the ions, as indicated by the dotted line in FIG. 1. The desired potentials are applied to the electrodes by power supplies, which maintain a constant potential difference on two conductors, which are the output of the power supply. The potential difference between electrodes is then maintained by making electrical contact between the conductors and the electrodes at either end of the region.

Figure 2:
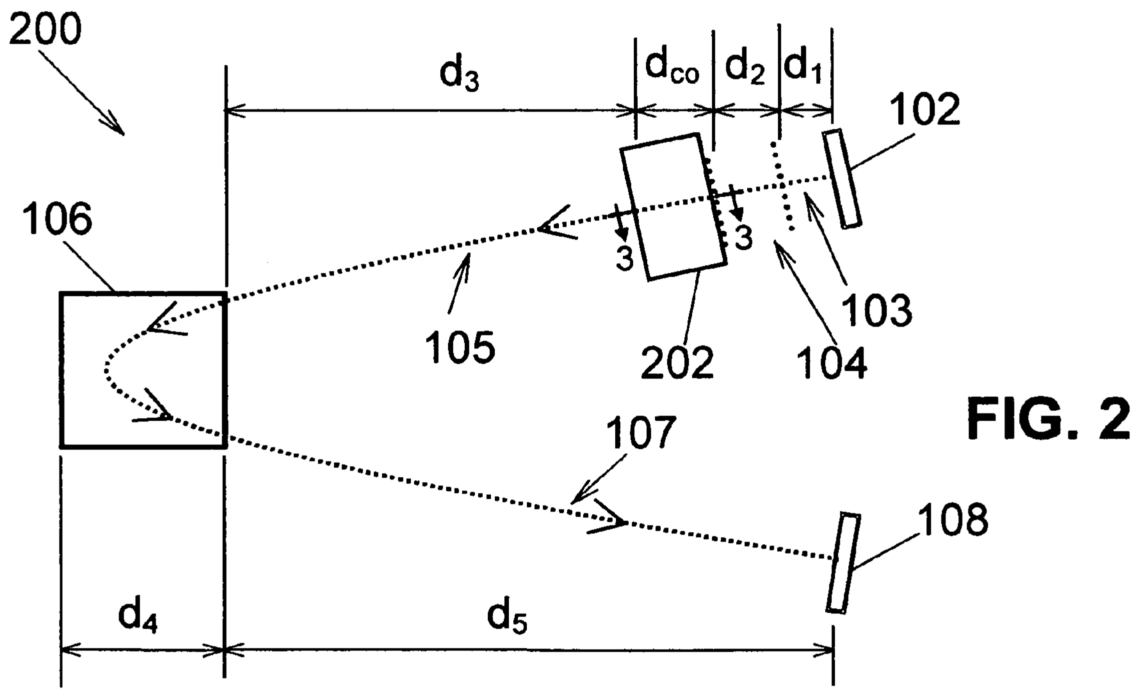
FIG. 2. illustrates another embodiment of the present invention time-of-flight mass spectrometer employing an ion mirror and a corrective ion optics element.

Another embodiment of the present invention time-of-flight mass spectrometer (TOF-MS) 200 employing an ion mirror 106 and a corrective ion optics element 202 is shown in FIG. 2. The corrective ion optics element 202, as shown, is comprised of an ion lens. A corrective ion optics element 202 is typically used in spectrometer design when there is a need to correct for the spread of ions in the radial direction (perpendicular to the path of ions through the TOF-MS). As shown, the corrective ion optic element 202 is positioned between the acceleration region 104 and the first field free region 105. The overall length of the corrective ion optic element 202 is $d_{co}$. The length of a corrective optics element can vary from approximately 1 to 3 cm, depending on type of corrective ion optics element 202 used. Under appropriate circumstances, different types/configurations of corrective ion optics elements 202 may be used, such as an ion lens in combination with an electrostatic deflection system, or an electrostatic deflection system alone, or an ion lens alone. An electrostatic deflection system allows for small adjustments to the path of ions through the TOF-MS.

Current goals for designers and researchers involved in TOF-MS development are to increase the mass resolution at either a single mass or over some selected range of masses. There are also compelling reasons to develop compact TOF-MS instruments. The design procedure for a TOF-MS that only performs energy focusing is as follows. The total TOF about the initial ion velocity is expanded in a series in powers of the velocity about the average velocity using the following equation:

$$t_{of}(m, v_i, z_i, \vec{V}, \vec{d}, \vec{\alpha}, \Delta\vec{t}) = \sum_{n=0} \frac{1}{n!} a_n (v_i - v_{avg})^n \quad (1)$$

$$a_n = \left.\frac{\partial^n t_{of}}{\partial v_i^n}\right|_{v_{avg}},$$

where m is the ion mass, $v_i$ is the initial ion velocity, $z_i$ is the initial ion position, $\vec{V}$ is the set of all potentials applied across various regions and elements, $\vec{d}$ is the set of all lengths of various regions and elements, $\vec{\sigma}$ is the set of all time constants of time-dependent potentials, and $\Delta\vec{t}$ is the set of all time delays. This is a Taylor series expansion, so the coefficients $\alpha_n$ of the expansion are the $n^{th}$ partial derivative of the time-of-flight with respect to the initial ion velocity evaluated at the average ion velocity and are functions of the initial ion velocity, ion mass, various dimensions, potentials, and other parameters of the spectrometer design. For exact focusing, these parameters are chosen such that the $\alpha_n$, are identically zero to some order of n, typically 2 (second order focusing), under some set of assumptions about the initial state of the ions, for example, the initial ion velocity distribution, ion mass, etc.

While setting the $\alpha_n$ all identically equal to zero ensures optimal performance of a spectrometer design, in general, this can only be done under special conditions which may not correspond to the actual ion conditions and over a narrow mass range. The functional form of the $\alpha_n$, which can oscillate as a function of mass, has not been utilized to optimize the design of a TOF-MS. A design method of the present invention uses this behavior to optimize the TOF-MS design.

For the sake of simplicity, the following discussion only considers molecules that are singly charged. For an arbitrary TOF-MS design, the time of flight as a function of the initial velocity can be expanded in a standard Taylor series about the average velocity of the ions. The general form of the equation is shown in Eq. (1). Although the expansion is only in one variable, the time of flight $t_{of}$ is also a function of m the mass of the ion, $v_i$ the initial ion velocity, $\vec{V}$ the acceleration, extraction, and ion mirror potentials and $\vec{d}$ the lengths of the various regions and the length of the ion mirror. In addition, it is assumed that the extraction potential is a function of time with a general functional form given by the following equation:

$$V_{ext}(t)=V_0+[V_{1a}(1-\exp(-\alpha_a(t-\Delta t_2)))+V_{1b}\exp(-\alpha_b(t-\Delta t_2))]\Theta(t-\Delta t_2)$$

where the Θ is the Heavyside function which forces the second term in Eq. (2) to zero when $t<\Delta t_2$. Exponential functions with time constants $\alpha_x^{-1}$ are assumed because they are easily reproduced using a high-voltage pulse generator, comprised of simple RC circuits. The time t is the time after an initial time delay $\Delta t_1$ and the second time delay $\Delta t_2$ is included to allow for behavior seen in other focusing schemes. See U.S. Pat. No. 5,969,348 and U.S. Pat. No. 6,518,568. The partial derivative of the time of flight with respect to the initial ion velocity can also be written as an expansion about the average velocity:

$$\frac{\partial t_{of}}{\partial v_i} = \sum_{n=1}^{k} \frac{1}{(n-1)!} a_n (v_i - v_{avg})^{n-1} \qquad (3)$$

Further refinement to this general method can be developed by considering that the $\alpha_n$ can themselves be expanded as a series in the mass, $$a_n = \sum_{l=1} b_{n,l} m^{l/2} \qquad (4)$$

In general, $\alpha_n$ are functions of the design parameters of the mass spectrometer and the mass of the ion, and can oscillate about zero or close to zero as a function of mass. Using this behavior, it is possible to design a TOF-MS with high resolution across a wide range of masses.

TOF-MS parameters that minimize Eq. (3) are determined by causing the $\alpha_n$ to oscillate over a wide range of masses, and that do not deviate much from zero over that range. Thus, not requiring exact space or energy focusing. However, if the correct parameters are chosen for this approach, high mass resolution may be obtained over a broad range of masses. This is a fundamentally different approach from the typical design goal of requiring that the $\alpha_n$ be zero.

For conditions where space focusing must be explicitly included in the design method the total time-of-flight can be expanded in a Taylor series of two variables, $v_i$ and $z_i$, analogous to Eq. (1), with coefficients analogous to the $\alpha_n$. These new coefficients also oscillate as a function of mass and this behavior can also be used in a method to design a TOF-MS, analogous to the way the $\alpha_n$ are used.

This method of design has a further advantage in that it favors TOF-MS designs that are short in overall length. The deviations of the $\alpha_n$ from zero result in an isomass packet of ions that is either expanding or contracting spatially in time as they strike the ion detector instead of ideally striking all at the same time, as with the typical design criteria of the $\alpha_n$ being all uniquely to zero. For this reason, TOF-MS designs of relatively short length minimize the spreading of the ion packets due to the deviations from zero of Eq. (3). Thus, there is a balancing act that must be performed between the total flight path length and the deviation from zero of the derivative.

Method of Design

A method of design of the present invention preferably uses the matrix assisted laser desorption/ionization (MALDI) technique to generate ions, see U.S. Pat. No. 5,118,937, therefore, two assumptions appropriate to this technique were made. One technique appropriate assumption is that all ions are substantially at the same position at t=0, a time $\Delta t_1$ after the laser fires. Therefore, the ion source does not require space focusing. This means that the requirement that the partial derivative of the time-of-flight of ions through the TOF-MS with respect to the initial ion position be substantially zero is automatically met in this case and therefore that part of this design method is also automatically met by using the MALDI technique to generate the ions. And finally, that the velocity distribution of our analyte ions is independent of the ion mass. Since the TOF-MS design employs an ion mirror, the $\alpha_n$ and $b_{n,1}$, of Eq. (4), are functions of fourteen variables/design parameters: five region lengths from FIG. 1 $d_1$ through $d_5$; six parameters of Eq. (2) that define the time-dependent extraction potential; the initial delay $\Delta t_1$; the acceleration potential; and the ion mirror potential. Because of the physical relationship, two of the parameters, $d_4$ (ion mirror length) and $V_3$ (the ion mirror potential) are not independent quantities. For a value of $d_4$ to have significance, the value of $V_3$ must be sufficient to turn an ion with the highest possible energy around over the length $d_4$ of the ion mirror. Because of this, $d_4$ is the parameter that is chosen during the design process and then $V_3$ is calculated from the maximum expected ion energy, leaving thirteen independent parameters to select.

However, if a corrective ion optics element 202 is used in a TOF-MS design, it is necessary to determine the time-of-flight though the corrective ion optics element 202 and add it to the total time-of-flight time through the rest of the TOF-MS 200, which is used to calculate the $\alpha_n$ of Eq. (3).

Figure 3:
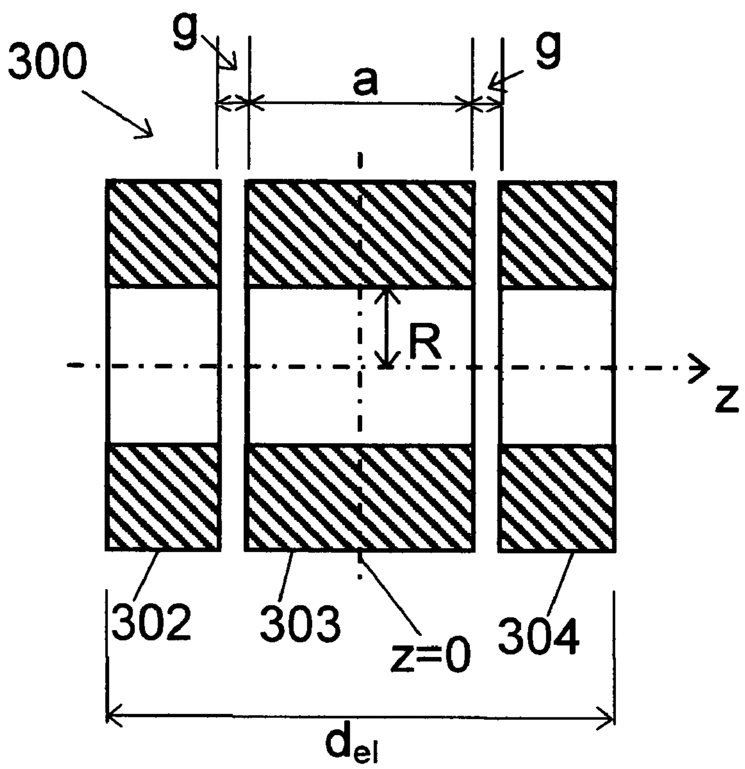
FIG. 3 is a cross-sectional view of the corrective ion optics element of FIG. 2. The corrective ion optics element, as shown, is a symmetric three-tube Einzel lens.

FIG. 3 is a cross-sectional view of the corrective ion optics element 202 of FIG. 2. The corrective ion optics element 202, as shown, is a symmetric three-tube Einzel lens 300. The Einzel lens 300 is a standard ion lens system used in TOF-MS design. The Einzel lens 300 is comprised of three conductive tubes, a first conductive tube 302, a center or second conductive tube 303, and a third conductive tube 304, with the axis of the tubes placed along the path of ion travel through the TOF-MS 200. As shown in FIG. 2, the corrective ion optics element is preferably positioned between the acceleration region 104 and the first field free region 105. If the corrective ion optics element 202 comprises both an Einzel lens 300 and an electrostatic deflection system, the Einzel lens 300 would be positioned before the electrostatic deflection system with the entire corrective ion lens element 202 positioned between the acceleration region 104 and the first field free region 105. R is the inside radius of the symmetric three-tube Einzel lens 300 and also the first conductive tube 302, second conductive tube 303 and third conductive tube 304. As shown, a is the length of the second conductive tube 303 and g is the length of the gap between first conductive tube 302 and second conductive tube 303, and between the second conductive tube 303 and the third conductive tube 304.

Where the corrective ion optics element 202 is Einzel lens 300 the time-of-flight through the Einzel lens 300 is calculated by first determining the potential along the path of ion travel and then the acceleration. The electric potential along the axis the symmetric three-tube Einzel lense 300 is given by:

$$V_{einzel}(z) = V_a + \frac{V_b - V_a}{2}\varphi(z) \qquad (5)$$

$$\varphi(z) = \frac{R}{\omega' g}\ln\left[\frac{A}{B}\right]$$

-continued $$A=\left[\cosh\left(\frac{2\omega z}{R}\right)+\cosh\left(\frac{\omega a+\omega' g}{R}\right)\right]$$

$$B=\left[\cosh\left(\frac{2\omega z}{R}\right)+\cosh\left(\frac{\omega a-\omega' g}{R}\right)\right]$$

where R and g are as described in the FIG. 3 description, ω=1.3183, and ω'=1.67. See Gillespie, G. H. and Brown, T. A., Proceedings of the 1997 Particle Accelerator Conference (cat no. 97CH36167). Piscataway N.J., USA: IEEE, vol. 2, pp. 2559–61, 1998. Additionally, potential $V_a$ is the potential applied to the first conductive tube 302 and third conductive tube 304, and potential $V_b$ is applied to the center or second conductive tube 303. The position along the axis of Einzel lens 300 is represented by z, which is measured from the center of Einzel lens 300, as shown in FIG. 3. The velocity of an ion traveling through Einzel lens 300 will not be constant, but the ion will have the same velocity upon exiting a properly designed Einzel lens 300 as it did before entering. Given the potential along the path of ion travel through the TOF-MS 200, the time-of-flight $t_{e1}$ through Einzel lens 300 can be calculated, either numerically or analytically, and this time added to total time of flight of the ion through the TOF-MS 200. The acceleration of an ion in the direction along the axis of the Einzel lens 300 is given by:

$$a(z)=-\frac{q}{m}\frac{\partial V_{einzel}(z)}{\partial z}, \tag{6}$$

where q is the charge on the ion, m is the ion mass and z is the length along the axis of the Einzel lens 300.

It is well known that other Einzel lens configurations are possible. See Gillespie, G. H. and Brown, T. A., Proceedings of the 1997 Particle Accelerator Conference (cat no. 97CH36167). Piscataway N.J., USA: IEEE, vol. 2, pp. 2559–61, 1998, for similar equations for two additional standard Einzel lens configurations, three-aperture lens and the center-tube lens. $V_a$ would be set to the potential of the first field free region and $V_b$ would be set to a value sufficient to correct for the radial spread of the ions.

Additionally, where an electrostatic deflection system is used in a corrective ion optics element 202 the time of flight through the deflection system must be added to the total time of flight through the TOF-MS 200, which is used to calculate the $\alpha_n$ of Eq. (3). A properly designed electrostatic deflection system does not alter the velocity of an ion traveling through it. See Dahl, P., *Introduction to Electron and Ion Optics*, Academic Press, 1973. The time it takes for an ion to travel through the electrostatic deflection system is $t_d=d_d/v_d$, where $d_d$ is the length of the electrostatic deflection system and $v_d$ is the velocity of ion when it enters the electrostatic deflection system.

Therefore, to incorporate the corrective ion optics element 202 into a method of design, it is only required that the time-of-flight through the corrective ion optics element 202, if present, including the time-of-flight through the electrostatic deflection system, if present, be added to the total time-of-flight through the rest of the TOF-MS 200, which is used to calculate the $\alpha_n$ of Eq. (3). The rest of the method is identical to that described for the preferred embodiment TOF-MS 100.

One skilled in the art of TOF-MS design can appreciate that the method of design of the present invention would work using other ionization techniques. These techniques include, but are not limited to, electro-spray (ESI), electron impact ionization (EI), chemical ionization (CI), desorption chemical ionization (DCI), field desorption (FD), field ionization (FI), fast atom bombardment (FAB), surface-assisted laser desorption ionization (SALDI), secondary ion mass spectrometry (SIMS), thermal ionization (TIMS), resonance ionization (RIMS), plasma-desorption ionization (PD), multiphoton ionization (MPI), and atmospheric pressure chemical ionization (APCI). Except for the atmospheric ionization techniques (ESI and APCI), all that is needed is knowledge of the initial ion velocity and initial ion position (inside the source/extraction region) distributions. For the atmospheric ionization techniques, a different set of assumptions would be required, for instance the potential across the atmospheric ionization region would be constant and the potential in the acceleration region would be time dependent.

All of the above mentioned ionization techniques are used to generate ions that are subsequently directed into an ion trap, a region where ions are confined by electric and magnetic fields. A trap based TOF-MS accumulates ions in the trap, thereby increasing the sensitivity of the instrument, and then ejects them, by altering the electric and/or magnetic fields, into the flight path of the TOF-MS. In this type of design, the trap is the ion source region and our method of design could be employed. Again, all that is needed is knowledge of the ion velocity distribution and ion position distribution within the trap.

A method of minimization is used to assign values to the thirteen remaining design parameters. The Levenburg-Marquardt (LM) method of nonlinear fitting is used as a minimization algorithm assuming a well-behaved error function. For this method of design, the derivative of the total time of flight with respect to the initial velocity as a function of mass is minimized. The error function employed is:

$$f_{error}(m)=\left(\frac{\sum_{n=1}^{k}\frac{\gamma_n}{(n-1)!}\alpha_n}{t_{of}(m)}\right)^2 \tag{7}$$

$$\gamma_n=\frac{3-(-1)^n}{2}\left[\frac{2^{\frac{n-2}{2}}\left(\frac{1}{\sigma^2}\right)^{\frac{1-n}{2}}\Gamma\left(\frac{1+n}{2}\right)}{3\sqrt{\pi}}\right]$$

Where Γ is the gamma function and σ is the standard deviation of the initial ion distribution. This function is evaluated for a range of masses given the fit parameters supplied by the nonlinear fitting algorithm. The $\gamma_n$ are scaling factors that modify the weight that each of the $\alpha_n$ is given and are primarily functions of the standard deviation σ of the initial ion velocity distribution. The sum of the weighted $\alpha_n$ are divided by the total time of flight, $t_{of}$, for the mass m to compensate for the fact that a larger $\gamma_n\alpha_n$ is allowable as $t_{of}$, increases, i.e., the longer the time of flight, the wider the detected peak can be and not effect the requirement of high mass resolution. It is standard to square an error function so that the lowest possible value of the function is zero. Although it is the total derivative of the time-of-flight with respect to the initial ion velocity that is of interest, for practical purposes, terms in Eq. (7) with n>4 do not contribute significantly to the value of the error function. The error function does not require that the derivative Eq.

(3) oscillate, however the nature of the $\alpha_n$ makes oscillation of Eq. (3) the most likely way that the error function will be minimized during the optimization process. One skilled in the art will understand that refinements to the error function are desirable and that the refinement process is a part of design method of the present invention. Although, for assumptions appropriate for MALDI ion generation, the partial derivative of the total ion time-of-flight through the TOF-MS with respect to the initial ion position is substantially zero and that part of the design method is automatically met, it would be easy to apply the preferred method for a case where effect of the initial ion position are significant, for example, electron impact ionization. The total time-of-flight Eq. (1) can be expanded in a Taylor series of two variables, producing a new set of coefficients analogous to the $\alpha_n$. These new coefficients would then be incorporated into an error function similar to Eq. (7) and the preferred design process could be applied using the new error function.

Nonlinear optimization algorithms are typically unconstrained, i.e., the values of the parameters can take on any value. But for this design, the parameters must be constrained to physically realizable/desirable values. To assure that the values remain in the necessary range, the parameters are constrained using a modified Log-Sigmoid Transformation, see Polyak, R. A., "Log-Sigmoid Multipliers Method in Constrained Optimization," *Annals of Operations Research*, vol. 101, pp. 427–60, 2001, where the constrained parameterp is transformed into an unconstrained variable p' by the following equation:

$$p = p_{\min} + p_{\max}\frac{1}{1+\exp(-kp')} \tag{8}$$

The parameter p is then constrained by $p_{min}$ and $p_{max}$, while the parameter to fit p' can take on any value between $-\infty$ and $+\infty$.

This particular optimization technique can minimize the error function, but it is not the only technique in which the design method can be achieved. Other optimization techniques that could be used include, but are not limited to, branch and bound techniques, see Pinter, J. D., *Global Optimization in Action*. Dordrecht, Netherlands: Kluwer, 1996; dynamic programming, see Adjiman, C. S. et al., "A Global Optimization Method, aBB, for General Twice-Differentiable Constrained NLPs—I. Theoretical Advances," *Comp. Chem. Engng.*, vol. 22, pp. 1137–58, 1998; simulated annealing, see Wang, T., *Global Optimization for Constrained Nonlinear Programming*, Ph.D. Thesis, Dept. of Computer Science, Univ. of Illinois, Urbana, Ill., December 2000; and evolutionary algorithms, see Yuret, D., *From Genetic Algorithms to Efficient Optimization*, Massachusetts Institute of Technology A.I. Technical Report No. 1569, 1994. It would also be possible to use analytic techniques to achieve our design goals. One skilled in the art will appreciate the large number of optimization techniques that could be applied to the design method.

Implementation

A graphical user interface was developed, using LabView®, to setup and monitor calculations, and sub-programs were written to perform the necessary calculations. A sub-program was used to calculate the total time-of-flight for a single ion with initial velocity $v_i$ and a mass m moving through a TOF-MS employing an ion mirror, having the fourteen parameters previously discussed. The program calculated the time for each ion to traverse each region of the TOF-MS using the standard kinematic equations of basic mechanics. The acceleration was calculated from the equation:

$$a = \frac{zeV}{md}, \tag{9}$$

where z×e is the charge on the ion in units of the charge on an electron e, V is the potential across the region, m is the mass of the ion and d is the length of the region. This assumes a linear change of the potential over the length of the region. For the case where the change in the potential is non-linear, the acceleration on the ion would have to be calculated from the gradient of the potential. A collection of isomass ions having a Gaussian velocity distribution defined by an average velocity $v_{avg}$ with a standard deviation of $\sigma$ is propagated through the spectrometer and the total time of flight for each ion is recorded. The full width half maximum (FWHM), $\Delta t$, of this packet as it reaches the position of the detector was calculated by another sub-program and hence the resolution at that mass:

$$\text{resolution} = \frac{m}{\Delta m} = \frac{t_{of}}{2\Delta t} \tag{10}$$

The FWHM is the width of a peak at half of its maximum value.

Figure 4:
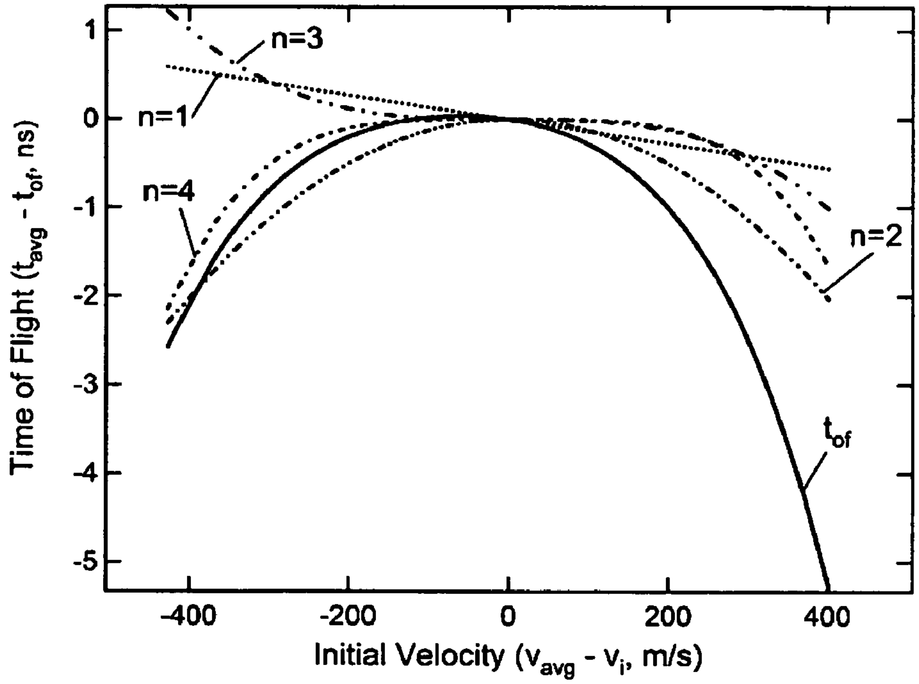
FIG. 4 illustrates the total time-of-flight versus the initial ion velocity at an ion mass of 100 kDa. The $n^{th}$ partial derivative of this function is calculated from a polynomial fit to this data as specified by Eq. (1).

The $\alpha_n$ from Eq. (2) is preferably calculated numerically from a polynomial fit to a graph of the total time-of-flight ($t_{of}$) versus the initial velocity ($v_i$). FIG. 4 illustrates a graph of $t_{of}$ versus $v_i$ at a mass of 100 kDa. The first four terms of Eq. (2) are also plotted using the calculated $\alpha_n$. Although the plot of $t_{of}$ appears to be dominated by the n=2 term of FIG. 4, other terms n=1, n=3, and n=4 also significantly contribute to the total time-of-flight, as shown.

For optimization problems involving so many parameters, there tends to be local minima and the selecting of good initial parameters is important. The sub-program that calculates time-of-flight is fast enough to evaluate the performance of the TOF-MS defined by randomly selected parameters in a short period of time. These random values are constrained by the constraint values shown in FIG. 5. A mean square error (MSE) is calculated with respect to an arbitrarily chosen function of $\Delta m$ versus mass. The configuration with the lowest MSE is then chosen as the initial parameters for the optimization algorithm. To one skilled in the art, it will be understood that no optimization algorithm guarantees that the optimal solution, i.e., the error function Eq. (7) has the absolute lowest possible value over the desired mass range, will be or can be found and not every set of parameters arrived at will be suitable for use. It is usually necessary to make multiple runs, starting from different initial parameters to get an acceptable design.

TOF-MS Using Method of Design

This section discusses the application of the method of design of the present invention to the TOF-MS embodiment 100 illustrated in FIG. 1. The table in FIG. 5 contains the design parameters for a TOF-MS 100 design employing an ion mirror and method of design of the present invention. The last column in the table indicates whether that particular parameter was constrained during the fitting procedure. As a general rule, only parameters that tend toward infinity or zero during fitting are constrained. The goal for this design was an overall length of the TOF-MS 100 of preferably less than 40 cm with mass resolution of approximately $10^4$ or higher for masses less than 100 kDa. All of the final fit parameters are physically realizable and as expected, the total length of the spectrometer is shorter than for conventional designs. The constraints for the potentials $V_0$, $V_{1a}$ and $V_{1b}$, from Eq. (2), were selected such that commercially available high-voltage solid-state switches could be used. There were no constraints placed on the exponential time constants $\alpha_a^{-1}$ and $\alpha_b^{-1}$. The two time-delays $\Delta t_1$ and $\Delta t_2$ were constrained to minimum values of 15 ns and 0.1 ns, respectively. In both cases, the delays tend to go to the smallest allowable value; the lower bound on $\Delta t_2$ is in practical terms a zero delay. The minimum of $\Delta t_1$ was set to keep the delay longer than the width of the laser pulse. The constraints on the acceleration potential $V_2$ were set to a maximum of about 20 kV, the maximum voltage available from the power supplies used, and a minimum of 0.1 mV to allow for a substantially zero acceleration potential. The ion mirror potential $V_3$ is calculated from the length $d_4$ of the ion mirror 106 and the highest expected ion energy, as previously discussed. The length $d_1$ of the source/extraction region 103 was constrained to a minimum size of 5 mm to minimize field leakage and to allow clearance to direct the laser onto the surface of the sample holder 102. The value of $d_2$ the length of the acceleration region 104 tends to go to zero during fitting causing the time through the acceleration region to go to zero and minimizing that contribution to the error function; a minimum value of 0.1 mm was used for the constraint. The maximum constraints on these values were arbitrarily chosen. It is possible to let $d_2$ be zero, but to maintain reasonable electric field values; the potential across the acceleration region 104 must also be zero when $d_2$ is zero. Length $d_3$, length of first field free drift region 105, was constrained to a minimum of 1 cm to keep the total time of flight to a reasonable value to minimize problems with the time response of the ion detector 108; the maximum limit was set to 20 cm to keep the design compact. The upper constraint on length $d_5$, length of second field free drift region 107, was set for similar reasons, but the minimum value was set to 1 mm to allow for a design where the ion detector 108 is substantially place at the position where the ions exit the ion mirror 106.

FIG. 6 illustrates a plot of the first four $\alpha_n$ from Eq. (3) scaled by the $\gamma_n$, at the beginning of the optimization procedure with parameters randomly selected as discussed above. All four terms contribute significantly to the error function Eq. (4) and oscillate as a function of mass. Below about 20 kDa, the $\alpha_1$ and $\alpha_2$ terms are the major contributions to the error function. As shown in FIG. 6, above 20 kDa the $\alpha_3$ and $\alpha_4$ terms also provide a significant contribution.

Figure 7:
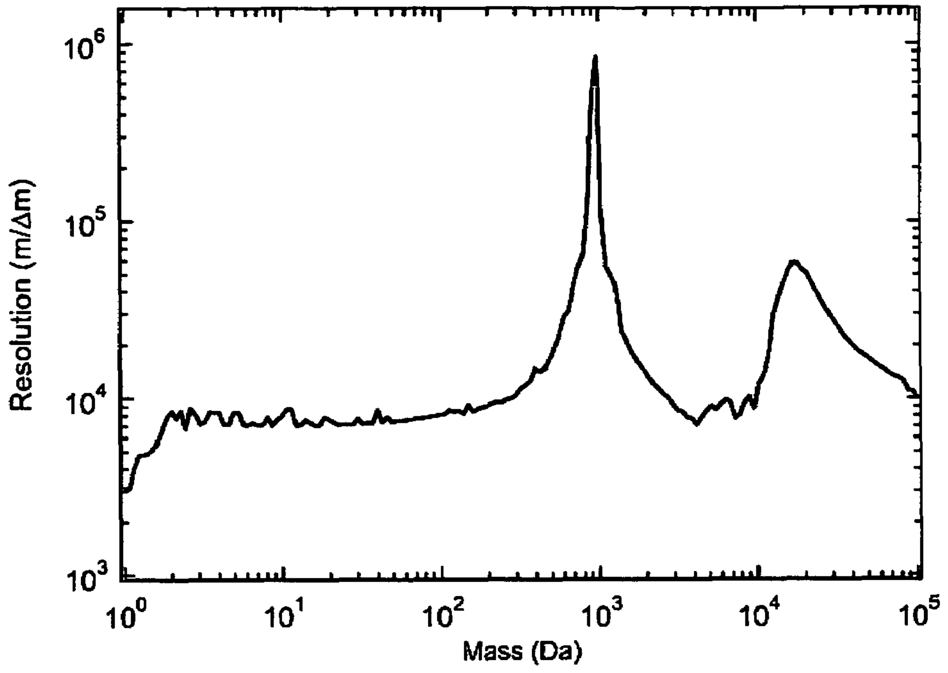
FIG. 7 illustrates the mass resolution as a function of mass for an embodiment of the present invention. The resolution is close to or over $10^4$ over five orders of magnitude with out the need to alter the operating parameters of the instrument. The peak mass resolution is nearly $10^6$ at 1000 Da.

The optimization routine minimized the error function by algorithmically selecting the values in the second column of the table in FIG. 5. To verify the results of the optimization algorithm, the trajectory of isomass ion packets and the mass resolution is calculated. FIG. 7 graphically illustrates the results of this calculation. The resolution m/Δm is approximately $10^4$ or higher over a mass range of five orders of magnitude. This is accomplished with out altering any of the potentials, time delays or lengths of the various regions of the TOF-MS 100. For a typical TOF-MS design, the instrument would have to be re-tuned to get maximum mass resolution over this broad of a range of mass. Re-tuning would typically involve adjusting potentials and time delays.

Figure 8:
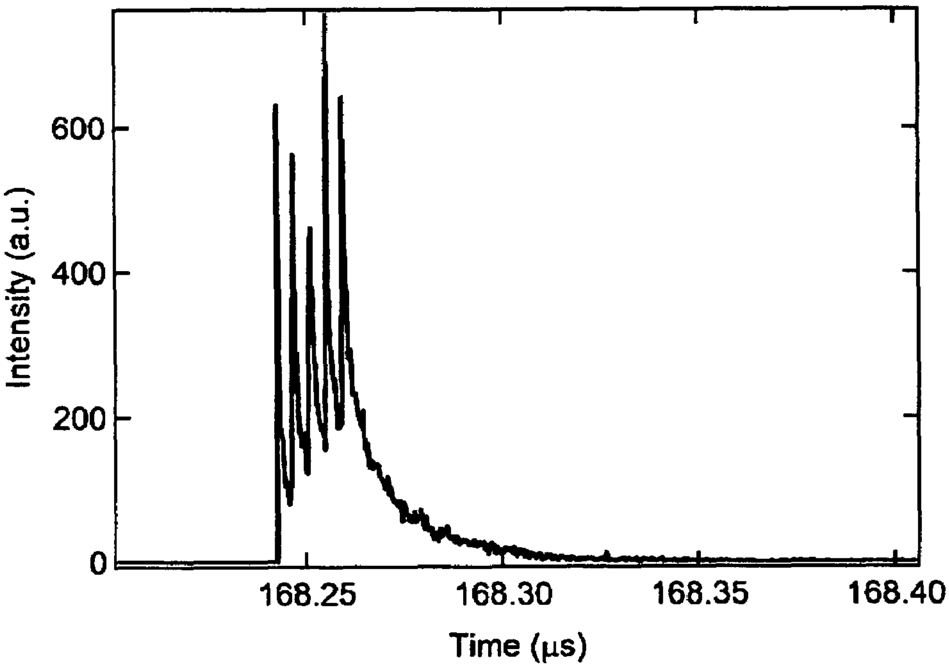
FIG. 8 illustrates the mass resolving power of an embodiment of the present invention. The peaks are spaced at 5 Da and are centered at 100 kDa. The peaks trail off to longer times because of the functional form of time-of-flight versus initial ion velocity, as shown in FIG. 4.

To demonstrate the mass resolving power of the of an embodiment of the present invention method of spectrometer design, the TOF peaks for five masses spaced at 5 Da and centered on a mass of 100 kDa are shown in FIG. 8. The width of these peaks corresponds to a mass resolution of greater than 20,000, which is higher than would be expected from the calculations plotted in FIG. 7. This is because the mass resolution, shown in FIG. 7 is calculated from fits to a Gaussian shape. The peaks in FIG. 8 are not Gaussian and Gaussian functions fit to peaks of that shape always underestimate the actual achievable mass resolution. The shape of the peaks in FIG. 8 can be explained by examination of FIG. 4. As shown in FIG. 4, the peak of the ion signal has a maximum near the average ion velocity; ions with higher and lower initial velocities all have longer time of flights causing the peak to have a tail that decays in intensity to longer times.

The time dependence of the extraction potential shown in Eq. (2) can, in general, be quite complicated. The laser fires at a time $t=-\Delta t_1$. There is a term that corresponds to a constant potential turned on at t=0, $\Delta t_1$ after the laser fires, which allows for solutions resembling the MCA scheme of U.S. Pat. No. 6,518,568 and the separate scheme of U.S. Pat. No. 5,969,348. And also terms for exponentially increasing and decreasing potential with RC time constants of $\alpha_a^{-1}$ and $\alpha_b^{-1}$, respectively, which are turned on at $t=\Delta t_2$. A time-dependent potential, preferably generated by a high-voltage pulse generator, with this functional form is simple to implement using fast high-voltage solid-state switches and circuits comprised of resistors and capacitors. Preferably, the high-voltage switches need to have rise times one the order of 10 ns, be capable of carrying currents of approximately 10 amps and switch voltages of as high as 20 kV, for example, those produced by Behlke® Electronics GmbH.

Figure 9:
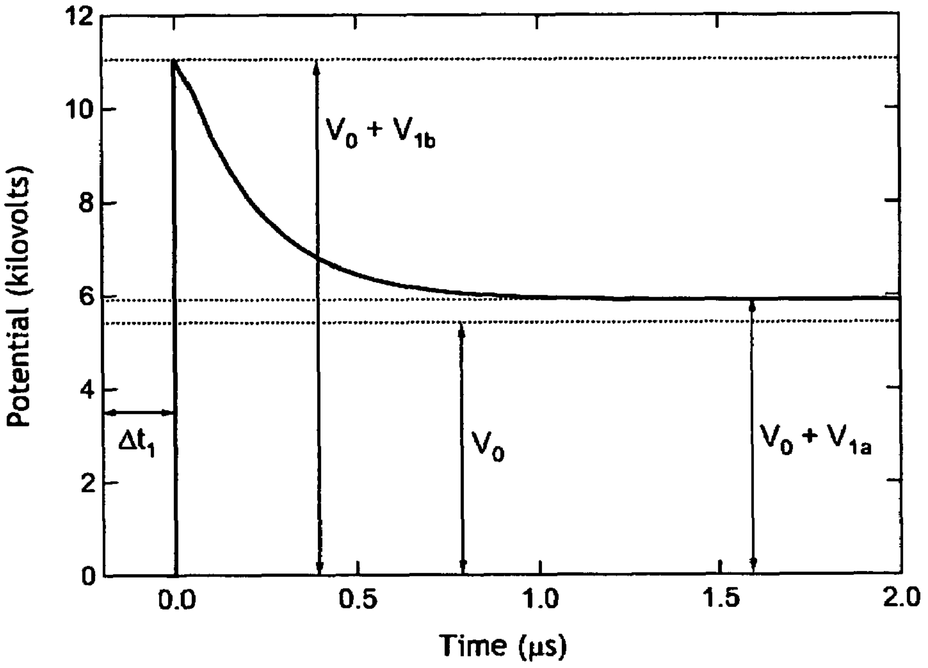
FIG. 9 illustrates the time dependence of the extraction potential that is applied across the source/extraction region. There is an initial delay $\Delta t_1$ after the generation of the ions after which, the potential rapidly increases to a value of $V_0+V_{1b}$, as defined by Eq. (2). The extraction potential then decreases at approximately an exponential rate determined by $\alpha_1$, $\alpha_2$, $V_{1b}$ and $V_{2b}$. At very long times the extraction potential approaches a value of $V_0+V_{1a}$.

The time dependence of the optimized extraction potential is shown in FIG. 9. In this case $\Delta t_1=19.1$ ns. For this embodiment, $\Delta t_2$ was set to 0.1 ns by the optimization algorithm. For practical purposes this is a zero time delay and the schemes employing such a second delay do not appear to be optimal for the stated design goals. The relative values of $V_{1a}$, $\alpha_a$, $V_{1b}$ and $\alpha_b$ are such that there is an extraction delay of $\Delta t_1$, at t=0 the potential is $V_0$, at $t=\Delta t_2$ the potential switches to $V_0+V_{1b}$, after which the extraction potential decays monotonically during the time in which the ions are present in the extraction region 103. Since $\Delta t_2$ is so small, zero in practical terms, the portion of the graph that is $V_0$ for 0.1 ns is too short to reproduce on the graph. At very long times, the extraction potential approaches $V_0+V_{1a}$. Thus, the optimization procedure results in a time-dependent extraction potential that is dominated by the exponentially decreasing term in Eq. (2).

One skilled in the art of designing and/or building TOF-MS instruments can appreciate that other design goals would alter the design parameter constraints and hence, the parameters of the final optimized TOF-MS design. To optimize over a select mass range, the error function Eq. (7) would only be calculated over that mass range during the optimization process. A design optimized for high masses, say greater than 10 kDa, ideal for looking for biological markers, would have an over all length that would tend to be shorter than for a design optimized for a range of masses between 1000 kDa and 10 kDa, ideal for sequencing protein digests or looking for biological fingerprints. This is because the wider velocity distribution of the higher masses, see FIG. 10, makes it easier to achieve high mass with a shorter over all TOF-MS length. The time response of the detector is also a consideration in the choice of design parameter constraints. Typical electron multiplier detectors have minimum pulse widths, $\Delta t$, of between 10 ns and 350 ps. The overall length of the TOF-MS and the magnitude of the potentials dictate the time-of-flight of an ion, shorter lengths and higher potentials result in shorter time-of-flights. The design constraints for a design that is to use a particular detector would then be partially dictated by the time response of the detector and the desired mass resolution of the desired mass range. For other applications, such as portable devices or devices for space based applications, the desire for a small overall volume and light weight would influence the choice of the design parameter constraints.

Physics of the Invention

Figure 10:
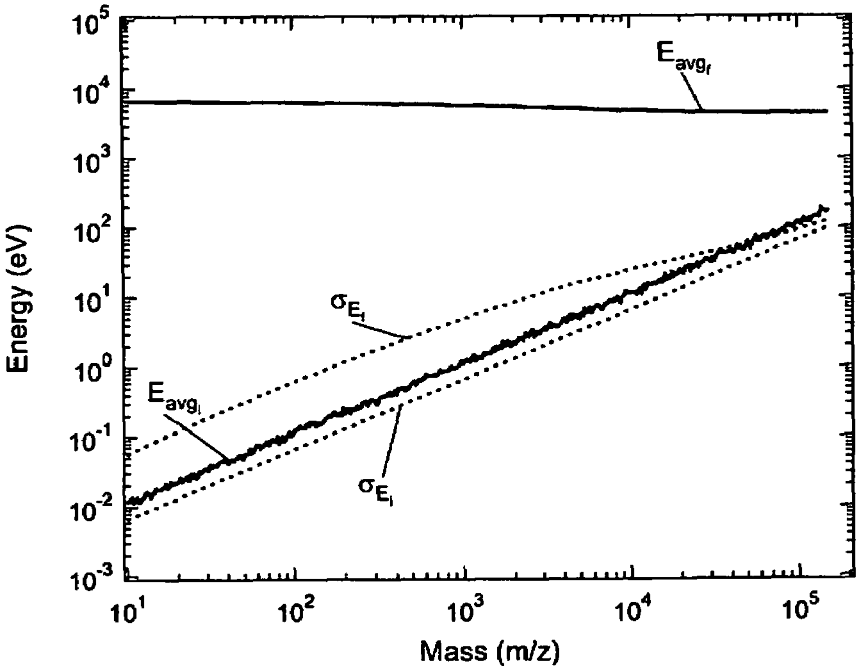
FIG. 10 illustrates the effect of the time-dependent extraction potential on the kinetic energy distribution of ions. The effect of the time-dependent extraction potential is that the peak in the energy distribution is nearly constant over four orders of magnitude of the mass while the width of the energy distribution is increased by nearly an order of magnitude across the mass range.

Although the method of design of the present invention results in a compact TOF-MS design that provides high mass resolution over a wide range of masses without retuning the instrument, it doesn't provide any insight into how the remarkable increase in performance over other designs is accomplished. The graph in FIG. 10 represents the initial and final (after traveling through the source/extraction region 102) kinetic energy distribution of ions as a function of mass by plotting the peaks in the kinetic energy distributions $E_{avgi}$ and $E_{avgf}$, and the standard deviations of those distributions, $\sigma_{Ei}$ and $\sigma_{Ef}$. Because a constant ion velocity distribution is used, the initial peak in the energy distribution $E_{avgi}$ increases linearly with mass, as does the initial standard deviation $\sigma_{Ei}$. However, after traveling through the source/extraction region 103, the peak in the ion kinetic energy distribution $E_{avgf}$ is nearly constant as a function of mass and the width of the energy distribution $\sigma_{Ef}$ has increased by as much as an order of magnitude. Previously, all ion-focusing schemes have assumed that the best way to deal with a large spread in the initial ion energy distribution is to reduce the energy spread in the extraction region. The prime example of this is the commonly used delay extraction technique, which was developed to specifically narrow the energy distribution of the ions. See U.S. Pat. No. 5,969,348.

Because the time-dependent extraction potential in the method of design of the present invention decreases as a function of time after $\Delta t_2$, it spreads out the energy distribution of the ions. Although this seems counter intuitive, the advantages of this revolutionary design can be understood by analogy to the physics of ultra-short laser pulses. To produce an ultra-short laser pulse requires a very broad bandwidth, i.e., the photons that make up the pulse have a large energy spread. The shorter the pulse the broader the energy spread needs to be. The present method of design works in an analogous way; the extraction pulse broadens the energy distribution of the ions, while creating a constant most-probable energy, as a function of mass. The ion mirror is optimized to focus a broad energy distribution at a fixed energy onto the detector in a short length, providing very high mass resolution over a broad range of mass. The short overall ion path length also obviates the requirement for perfect focusing at the ion detector, as previously discussed.

While a preferred embodiment of the invention has been illustrated and described, it will be appreciated that various changes can be made therein without departing from the spirit and scope of the invention.

The invention claimed is:

1. A method for high-resolution analysis of analyte ions in a time-of-flight mass spectrometer (TOF-MS), comprising:

a) applying potentials across an acceleration region and an ion mirror;

b) ionizing analyte molecules in a source/extraction region;

c) focusing ions of like charge-to-mass ratio onto an ion detector by the steps comprising:

i) waiting a predetermined delay time following ionization;

ii) generating a time-dependent extraction potential across the source/extraction region;

iii) decreasing the strength of the time-dependent extraction potential according to a predetermined continuous function so as to spread out the energy distribution of the ions;

iv) passing the ions out of the source/extraction region;

v) passing the ions through the acceleration region;

vi) passing the ions through a first field free drift region;

vii) passing the ions through the ion mirror to compensate for the energy distribution of the ions; and viii) passing the ions through a second field free drift region;

d) detecting the ions as they strike the ion detector;

e) having the like charge-to-mass ratio ions generated in ionization step b) arrive at the ion detector at a time that is substantially independent of:

i) initial ion velocity at the beginning of the ion extraction; and ii) initial position of the ion in the source/extraction region at the beginning of ion extraction; and f) achieving high mass resolution over a broad range of masses without altering the magnitude of the applied potentials across the acceleration region and ion mirror, and the time dependence or magnitude of the time-dependent extraction potential, and not changing the physical dimensions of the TOF-MS.

2. The method according to claim 1, wherein the predetermined continuous function follows exponential function $V_{ext}(t)=V_0+[V_{1a}(1-\exp(-\alpha_a t)) + V_{1b}\exp(-\alpha_b t)]$, where $V_{ext}(t)$ is the time-dependent extraction potential, $V_{1b}\exp(-\alpha_b t)$ is an exponentially decreasing term with time, $\alpha_b$ determines how fast the exponentially decreasing term decreases, $V_0+V_{1b}$ is the time-dependent extraction potential at t=0, $V_{1a}[1-\exp(-\alpha_a t)]$ is an exponentially increasing term with time, $\alpha_a$ determines how fast the exponentially increasing term increases, $V_0+V_{1a}$ is the time-dependent extraction potential at $t=\infty$, the exponentially decreasing term dominates the time dependence of the function, and t is the time after an initial extraction delay time.

3. The method according to claim 1, wherein high mass resolution over a broad range of masses is obtained by setting design parameters of the TOF-MS such that the partial derivative of the total time-of-flight with respect to the initial ion velocity oscillates about or near zero over a broad mass range.

4. The method according to claim 1, wherein high mass resolution over a broad range of masses is obtained by setting design parameters of the TOF-MS such that the partial derivative of the total time-of-flight with respect to the initial ion position oscillates about or near zero over a broad mass range.

5. The method according to claim 1, further comprising passing the ions through corrective ion optics.

6. The method according to claim 1, wherein the analyte molecules are ionized (step b) by matrix assisted laser desorption/ionization (MALDI) process.

7. The method according to claim 1, wherein the analyte molecules are ionized (step b) by a pulse of energy from a laser.

8. The method according to claim 1, wherein ions are generated in a time less than 100 ns.

9. The method according to claim 1, wherein the predetermined delay time is zero.

10. The method according to claim 1, wherein the applied potential across the acceleration region is zero.

11. The method according to claim 1, wherein the length of the acceleration region is zero.

12. The method according to claim 1, wherein the length of the second field free drift region is zero.

13. The method according to claim 1, wherein the first field free drift region is substantially the same region as the second field free drift region.

14. The method according to claim 1, wherein the TOF-MS operates with substantially the same applied potentials, across the acceleration region and ion mirror, and the time-dependent extraction potential over a range of analyte mass-to-charge ratios (m/z) of approximately up to six orders of magnitude.

15. The method according to claim 1, wherein the derivative of ion arrival time at the ion detector with respect to initial ion velocity is substantially zero over a range of analyte mass-to-charge ratios (m/z) of approximately up to six orders of magnitude with substantially the same applied potentials, across the acceleration region and ion mirror, and the time-dependent extraction potential.

16. The method according to claim 1, wherein the derivative of ion arrival time at the ion detector with respect to initial ion position is substantially zero over a range of analyte mass-to-charge ratios (m/z) of approximately up to six orders of magnitude with substantially the same applied potentials, across the acceleration region and ion mirror, and the time-dependent extraction potential.

17. The method according to claim 1, wherein the time-dependent extraction potential is generated by:

a) high-voltage pulse generator, comprising:
   i) at least one high-voltage switch,
   ii) at least one resistor, and
   iii) at least one capacitor; and
b) applying the output of the high-voltage pulse generator across the source/extraction region.

18. A time-of-flight mass spectrometer (TOF-MS) contained in a vacuum housing, comprising:

a) sample holder;
b) source/extraction region;
c) acceleration region;
d) first field free drift region;
e) ion mirror;
f) second field free drift region;
g) ion detector; and
h) means for applying a time-dependent extraction potential according to a predetermined continuous function so as to spread out the energy distribution of the ions as they travel through the source/extraction region.

19. The TOF-MS of claim 18, wherein the predetermined continuous function follows exponential function $V_{ext}(t)=V_0+[V_{1a}(1-\exp(-\alpha_a t))+V_{1b}\exp(-\alpha_b t)]$, where $V_{ext}(t)$ is the time dependant extraction potential, $V_{1b}\exp(-\alpha_b t)$ is an exponentially decreasing term with time, $\alpha_b$ determines how fast the exponentially decreasing term decreases, $V_0+V_{1b}$ is the time-dependent extraction potential at $t=0V_{1a}[1-\exp(-\alpha_a t)]$ is an exponentially increasing term with time, $\alpha_a$ determines how fast the exponentially increasing term increases, $V_0+V_{1a}$ is the time-dependent extraction potential at $t=\infty$, the exponentially decreasing term dominates the time dependence of the function, and t is the time after an initial extraction delay time.

20. The TOF-MS of claim 18, wherein the TOF-MS further comprises corrective ion optics.

21. The TOF-MS of claim 18, wherein the total length of the vacuum housing of about 5 cm to 80 cm.

22. The TOF-MS of claim 18, wherein the means for applying the time-dependent extraction potential comprises:

a) high-voltage pulse generator, comprising:
   i) at least one high-voltage switch,
   ii) at least one resistor, and
   iii) at least one capacitor; and
b) means for applying the output of the high-voltage pulse generator across the source/extraction region.

* * * * *